United States Patent [19]
Prasse et al.

[11] 3,814,447
[45] June 4, 1974

[54] SEALING ELEMENT FOR USE IN INTERNAL COMBUSTION ENGINES

[75] Inventors: Herbert F. Prasse, Town & Country; Harold E. McCormick, Ballwin, both of Mo.

[73] Assignee: Ramsey Corporation, St. Louis, Mo.

[22] Filed: Nov. 2, 1972

[21] Appl. No.: 303,114

[52] U.S. Cl.............. 277/224, 29/196.6, 117/93.1, 277/235 A
[51] Int. Cl.......................... B32b 15/18, F16j 9/00
[58] Field of Search............ 29/196.6; 117/93.1 PF, 117/105.2, 105; 277/235 A, 235, 236, 224, 96

[56] References Cited
UNITED STATES PATENTS

| | | | |
|---|---|---|---|
| 3,211,548 | 10/1965 | Scheller et al. | 117/93.1 PF |
| 3,536,192 | 11/1970 | Prasse | 117/93.1 PF |
| 3,542,530 | 11/1970 | Talboom et al. | 29/196.6 |
| 3,617,349 | 11/1971 | Prasse | 277/235 A |
| 3,642,517 | 2/1972 | Faber | 29/196.6 |
| 3,725,017 | 4/1973 | Prasse et al. | 29/196.6 |
| 3,749,559 | 7/1973 | Prasse | 277/235 A |

Primary Examiner—Louis R. Prince
Assistant Examiner—Robert I. Smith
Attorney, Agent, or Firm—Hill, Gross, Simpson, Van Santen, Steadman, Chiara & Simpson

[57] ABSTRACT

Sealing elements for use in internal combustion engines, such as piston rings for reciprocating pistons, seals for rotary pistons in engines of the type generally referred to as the Wankel engine, and similar structures in which a sealing element having a hard, wear-resistant bearing surface provides a seal between relatively movable slidable surfaces to prevent or substantially reduce flow therebetween of fluids such as combustion gases, oil films and the like. Such hard, wear and scuff-resistant facings, coatings and the like are preferably provided by the plasma jet application to the peripheral bearing surfaces of the sealing elements of alloy-forming compositions comprising effective proportions of a tungsten carbide-cobalt aggregate; molybdenum; and a nickel-chrome-boron-silicon alloy. For best results the plasma-applied final coating is substantially free from such detrimental components as nickel in its free state and aluminum oxide. If the nickel is present only in a combined form, as it is in nicrome (a nickel-chrome alloy containing about 60% Ni), the nickel has no detrimental effect.

23 Claims, 11 Drawing Figures

PATENTED JUN 4 1974
3,814,447
SHEET 1 OF 2
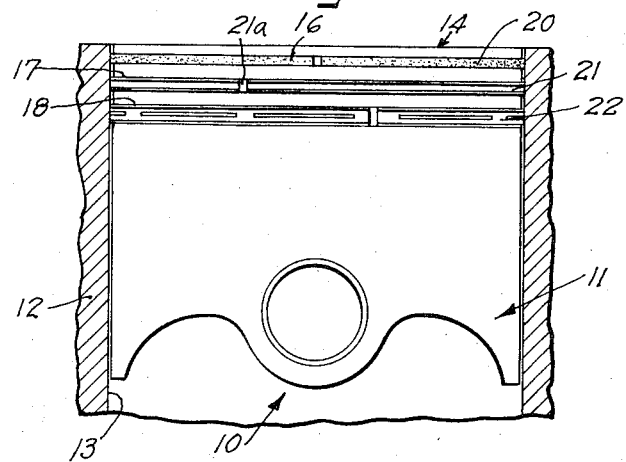
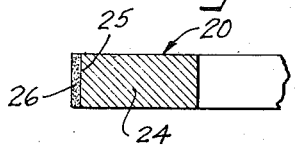
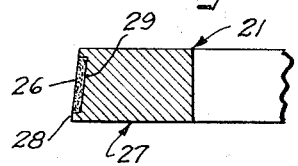
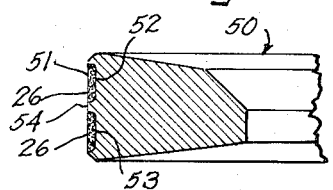
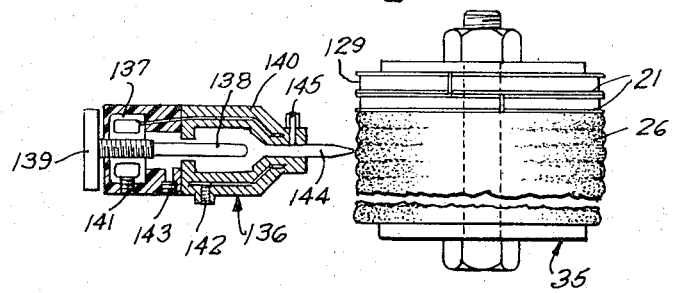

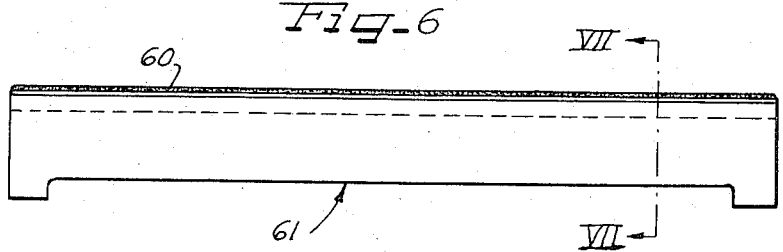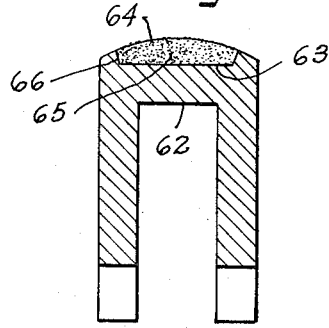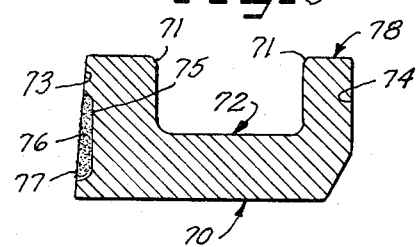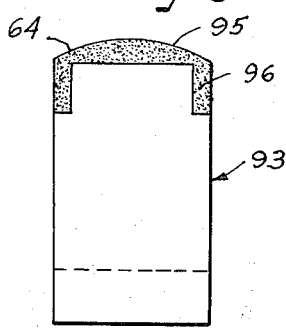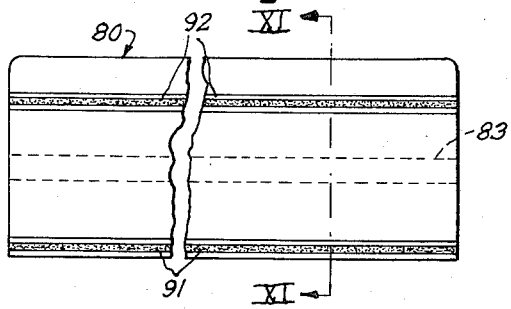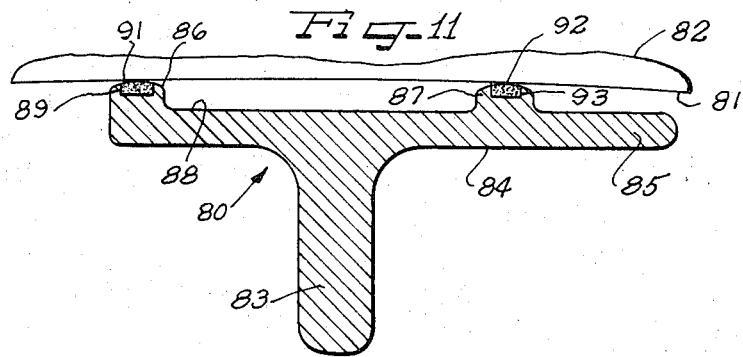

SEALING ELEMENT FOR USE IN INTERNAL COMBUSTION ENGINES

BACKGROUND OF THE INVENTION

This invention pertains to sealing elements, such as piston rings, packing rings, and other seals for use in restricting or substantially preventing the flow of fluids such as gaseous products of combustion between superficially contacting, relatively slidable surfaces, such as those of the piston and the wall of the bore or chamber in which the piston reciprocates or rotates.

The prior art includes patents that disclose sealing elements coated with hard-, wear-resistant bearing surfaces having good scuff-resisting properties, including U.S. Pat. Nos. 2,905,512; 3,133,739; 3,133,341; 3,281,156; 3,539,192; 3,606,359 and 3,690,686.

SUMMARY OF THE INVENTION

The present invention provides plasma-applied bearing facings or coatings that are highly wear and scuff-resistant and that have high hardness and relatively low porosity characteristics. The plasma-applied coatings can be bonded directly to the body metal, which usually is a ferrous alloy, or for higher bond strength a separate bond coating can be used that preferably is free from free nickel, free aluminum and free aluminum oxide. The final alloy coatings formed from plasma-applied mixtures in accordance with the present invention are substantially free from those components that we have found to be detrimental.

For instance, free nickel has been eliminated from our alloy-forming powder since it is detrimental in the final coating for a number of reasons. It is likely to give rise to intergranular corrosion when subjected to certain concentrations of sulfur, resulting perhaps from the sulfur content of sulfur-containing diesel fuels. We have found failures in plasma-applied coatings containing approximately 17 percent free nickel in the "as deposited" coatings.

We have also found that aluminum oxide in as small a percentage as 1 percent or 2 percent by weight of the final alloy coating is undesirable from the standpoint of scuff resistance.

On the other hand, we know from experience that molybdenum and certain molybdenum alloys exhibit the highest degree of scuff resistance when plasma jet-applied to sealing elements as bearing facings or coatings.

A mixture of starting materials in the following percentages by weight is an example of a suitable molybdenum-containing composition for forming a final coating substantially devoid of free nickel and from aluminum oxide.

TABLE I

| Components of Starting Materials | Ranges—% by wt. | |
|---|---|---|
| | Preferred | Broad |
| Tungsten carbide-cobalt aggregate | 38–42 | 30–50 |
| Molybdenum | 30–40 | 25–45 |
| Nickel-chromium-boron-silicon alloy | 18–32 | balance |

In the foregoing Table I, the tungsten is present as tungsten carbide (WC) in the tungsten carbide-cobalt aggregate, comprising 88 percent WC and 12 percent cobalt, as free cobalt. The nickel-chromium-boron-silicon alloy can be pre-formed separately and made available in powdered form for admixture with the other powdered components, or a pre-alloy of all of the components can be prepared and powdered for use as a starting material.

Table II gives the break-down of the tungsten carbide-cobalt aggregate of Table I into its constituent elements, as follows:

TABLE II

| Elements | Ranges—% by wt. |
|---|---|
| Tungsten | 79.5 to 83.5 |
| Cobalt | 11.0 to 13.0 |
| Carbon | 5.15 to 9.5 |
| Iron | up to 1.5 maximum | and the balance by difference being non-essential components including impurities.

A break-down of the nickel-chromium boron-silicon alloy of Table I is shown in the following Table III:

TABLE III

| Elements | Ranges—% by wt. |
|---|---|
| Nickel | 60 to 75 |
| Chromium | 13.0 to 20 |
| Silicon | 3 to 5 |
| Boron | 2.75 to 4.7 |
| Iron | 3 to 5 |
| Carbon | 0.6 to 1.3 |
| Cobalt | 0.1 maximum | and the balance by difference being non-essential components including impurities.

The "balance" in the foregoing tables and in the following Table IV are non-essential elements that are present, usually unavoidably or as impurities.

After the tungsten carbide-cobalt aggregate; the molybdenum; and the nickel-chromium-boron-silicon alloy of Table I have been prepared in powered form and mixed together within the percentage ranges given in Table I, the respective components of the resultant powder mixture are present therein within the weight percentages shown in Table IV:

TABLE IV

| Elements | Ranges—% by wt. | |
|---|---|---|
| | Narrower | Broader |
| Tungsten | from about 30 to about 35 | 24–42 |
| Cobalt | from about 4 to 6 | 3.2–6.5 |
| Carbon | from about 1.9 to about 4 | 1.6–5 |
| Molybdenum | from about 30 to about 40 | 25–45 |
| Nickel | from about 10 to about 24 | 3–34 |
| Chromium | from about 2.3 to about 6.4 | 1–9 |
| Silicon | from about 0.5 to about 1.6 | 0.1–2.25 |
| Boron | from about 0.4 to about 1.5 | 0.1–2.2 |
| Iron | from about 0.5 to about 0.6 | | and the balance by difference being non-essential ingredients including impurities.

The plasma-jet-applied composition of Table IV forms the desired wear and scuff-resistant bearing facing or coating.

It is therefore an important object of this invention to provide a sealing element for restricting the flow of fluids between superficially contacting, relatively slidable surfaces, such as the surfaces of a reciprocating piston and its cylinder wall, as in a conventional internal combustion engine, or between a rotary piston, or rotor, and its housing, as in the Wankel engine. In any of these types of internal combustion engine structures our seal bearing facings or coatings have superior wear and scuff-resistance by virtue of their composition and their having been applied by means of a plasma jet stream.

A further object of our invention is to provide an improved composition for plasma-jet-application as hard, wear- and scuff-resistant bearing facings on seals for use in restricting the flow of gaseous products of combustion and other fluids or liquids between relatively slidable surfaces.

A further important object of our invention is to provide sealing elements with plasma jet-applied hard, scuff-resistant bearing facings of excellent wearing properties and low porosity suitable for use in either a reciprocating type or a rotary type of piston, the bearing facings being of a composition substantially devoid of free nickel or free aluminum oxide or other ingredients that are detrimental from a scuff-resistant standpoint.

Other and further objects of this invention will be apparent to those skilled in this art from the following detailed description of the annexed sheets of drawings which illustrate preferred embodiments of our invention.

BRIEF DESCRIPTION OF THE DRAWINGS

FIG. 1 is a side elevational view, with parts in cross-section, of a reciprocating type of engine piston and cylinder assembly, wherein the piston has ring grooves equipped with compression and oil control rings each having a bearing face engaging the cylinder wall which is composed of an in situ, plasma jet-formed, coating composition embodying the principles of this invention;

FIG. 2 is an enlarged fragmentary sectional view of the top compression ring in the piston of FIG. 1;

FIG. 3 is a view similar to FIG. 2 but illustrating the second compression ring in the piston assembly of FIG. 1;

FIG. 4 is a fragmentary sectional view of a coated keystone piston ring for a diesel engine;

FIG. 5 is an elevational view of a vertically disposed arbor carrying piston rings in the process of being plasma jet-coated in accordance with the principles of our invention;

FIG. 6 is an elevational lengthwise view of an apex seal for use with a rotary piston type of internal combustion engine;

FIG. 7 is an enlarged transverse sectional view taken along the line VII—VII of FIG. 6;

FIG. 8 is a sectional view similar to that of FIG. 7 but with our coating on an upper face of the apex seal and extended to and along the sides thereof;

FIG. 9 is an enlarged cross-sectional view of an inner oil seal ring, with no gap, also for use with a rotary piston type engine;

FIG. 10 is a broken enlarged top plan view of a slipper type apex seal; and

FIG. 11 is a further enlarged sectional view taken along the line XI—XI of FIG. 10, showing a fragmentary portion of the piston housing with which the apex seal is in sliding contact to inhibit flow therebetween of fluids, including gaseous products of combustion.

DESCRIPTION OF THE PREFERRED EMBODIMENTS

The piston and cylinder assembly, indicated generally by the reference numeral 10 in FIG. 1, illustrates a conventional 3-ring grooved internal combustion engine piston 11, reciprocating in an engine cylinder 12. The engine cylinder 12 provides a bore 13, that receives said piston 11 in a reciprocating, relatively slidable relationship. The piston 11 has a head 14 with a ringband 15 providing three peripheral ring grooves 16, 17 and 18. The top ring groove 16 has a split solid cast iron compression or fire piston ring 20 therein. The second ring groove 17 has a split solid second compression ring 21, which is usually the same width as the ring 20 but not necessarily so. The third ring groove 18 carries a two-piece oil control ring assembly 22.

The top compression ring or fire ring 20, as shown in FIG. 2, has a main body 24. In practice, most top compression rings are formed of flake-type piston ring iron; but for high performance and diesel heavy-duty engines modular gray iron, usually with a carbon content of about 3.5 percent by weight, is preferred. The outer periphery 25 of the ring 20 is right-cylindrical in shape and is covered with an alloy coating 26 that is plasma jet-applied in situ. In use, with the ring 20 conformed by the wall of the bore 13 to a truly cylindrical shape, the alloy coating 26 is in contacting relatively sliding relationship to the inner surface of the cylinder 12.

As shown in FIG. 3, the second compression ring 21 in FIG. 1 has a main body 27 which can be composed of the same flake-type piston ring iron as the body 24 of the ring 20. The outer periphery 28 of the body 27 instead of being right cylindrical is inclined upwardly and inwardly from the lower or bottom edge of the ring, and a peripheral groove 29 is formed in this inclined periphery but not for the full height thereof. Said groove 29 can be suitably filled with the same alloy coating material of our invention as that previously indicated at 26 in FIG. 2.

FIG. 4 illustrates a modified form of piston ring in which the piston ring 50 is a keystone ring for diesel engines. The outer periphery of the ring 50 is a right cylindrical surface 51 having therein two annular grooves 52 and 53 separated by a narrow annular band 54 formed of the metal of the ring body. Said gooves 52 and 53 are filled with the coating material 26 embodying our invention as hereinbefore described and functioning to provide a hard, wear and scuff-resistant seal against the cylinder wall with which it is in sliding, sealing contact during operation of the internal combustion engine.

As shown in FIG. 5, a plurality of rings, such as the rings 21, are stacked on a vertical arbor 35, and compressed with their split ends substantially in abutment. With a stack of such rings in their nearly closed, contracted position, and with the assembly of the stack of the contracted rings held in a lathe, the peripheries of the rings are machined to form grooves, such as the grooves 29. These grooves are then filled by the plasma jet-application of the material to form the coatings 26, using a plasma-jet spray gun 136. Any excess of the coating is removed by grinding.

The gun 136 includes an insulated casing 137, such as a nylon casing, into which projects a rear electrode 138, the extent of projection of which is adjustably controlled by a threaded knob 139. The front face of the casing receives a front electrode 140. The casing 137 and electrode 140 are both hollow and water-jacketed so that water may circulate as a coolant therethrough from an inlet 141 to an outlet 142. Plasma jet gas is fed through an inlet 143 into the chamber provided by the casing 137 and the front electrode 140 to flow around the rear electrode 138.

The front end of the electrode 140 provides a nozzle outlet 144 for the plasma flame, into which are fed through a powder inlet 145 the powdered ingredients that provide the coatings 26 on the outer peripheries of the rings 20 or in the grooves of the grooved rings 21 and 50.

The plasma, which is composed of ionized gas, is produced by passing the plasma gas from the inlet 143 through an electric arc established between the electrodes 138 and 140. The plasma gas so introduced into the inlet 143 is preferably composed of nitrogen and hydrogen and therefore is itself nonoxidizing. However, the resulting plasma jet effects the aspiration into the jet flame, after it leaves the nozzle outlet 144, of sufficient air to provide an oxidizing atmosphere surrounding the alloy-forming powder capable of converting any tungsten carbide present in such powder into free tungsten metal in accordance with the following equation:

$$3\ WC + 2O_2 \rightarrow 2\ CO_2 + W + W_2C$$

The WC is present at all in the final coating is present in such minute amounts as not to show up upon electron probe or spectrophotometric analysis.

To accomplish the oxidation of the tungsten carbide present in the alloy-forming powder fed into the flame, the plasma flame should be an oxidizing flame approximately 2 inches from the nozzle of the plasma gun and at that distance from the nozzle the flame should contain approximately 80 percent air by volume.

In place of nitrogen, argon or helium or a mixture of the two can be used as a carrier gas for the powder. The plasma flame projected as a jet stream from the nozzle outlet 144 serves to draw the alloy-forming powder by aspiration into the plasma flame and to subject the ingredients of the powder to such high temperatures as to cause them to fuse together into a homogenous alloy. The jet stream carries the fused alloy against the relatively cool outer peripheries 25 of the rings 20 to solidify thereagainst to coat the same, as at 26, or to carry the fused alloy into the bottom of the grooves 29 formed in the piston rings 21, whichever type of ring is mounted on the arbor 35. The peripheries 25 or the grooves 29 are thus coated or filled with the in situ deposited coatings 26 that provide bearing facings for said rings.

The sealing element of our invention, in general, comprises a relatively rigid body, or substrate, and a coating material bonded thereto to provide a bearing face in sealing contact with a relatively movable surface of a pair of superfically contacting relatively sliding surfaces. As thus far described by reference to FIGS. 1 to 5, inclusive, our invention is embodied in a piston ring having a coating bonded thereto of a scuff-resistant alloy for sealing contact with the cylinder wall and an internal combustion engine as the piston reciprocates in said cylinder. However, the same principles of our invention are applicable to providing seals, such as apex seals and the like, for use with a rotary type of piston, as in a Wankel engine. It will therefore be understood that the same scuff-resistant alloys and combinations of such alloyws with suitable matrices as are described for the piston rings of a reciprocating type of engine are similarly useful with the rotary piston assemblies typical of the Wankel engine.

Such alloys and their combinations with suitable matrices will be described both in terms of the alloy-forming metal and metalloid powders that are applied to a sealing element by a plasma jet to form the described alloy in situ, and also in terms of the composition of the final alloy and its constituent phases as determined by micro-probe and spectrophotometric analysis and by photomicroscopy.

EXAMPLE

In this Example the starting material for making a suitable hard, wear-resistant alloy is a powdered mixture of the components set forth in Table 1 within the specified preferred range of proportions by weight of 38–42 percent tungsten carbide-cobalt aggregate; 30–40 percent molybdenum; and 18–32 percent nickel-chromium-boron-silicon alloy. The total composition of the powdered mixture lies within the narrower range of %'s by weight given in Table IV above.

This powdered mixture of alloy-forming ingredients was applied to a selected ferrous metal substrate, such as used in piston seals, by the plasma jet technique but using an oxidizing plasma flame so that any carbon present as tungsten carbide or other metal carbide is oxidized to substantially eliminate carbon from the final alloy coating. As described more particularly in application, Ser. No. 1,187 and now U.S. Pat No. 3,725,017, not only is the carbon oxidized to convert the tungsten carbide of the starting material into tungsten metal, but the tungsten metal so released is subjected to such conditions as to ambient temperature and composition of the plasma flame as to cause the free tungsten metal to react with the boron present and form, on deposition and cooling, a coating containing a tungsten-boron phase in which the boron is interstitially dispersed throughout the tungsten to form a hardened tungsten. The hardened tunsten-boron phase has a hardness measured in Knoop (KHN) numbers of 1,200 Knoop, indicating much greater hardness than pure tungsten.

The final alloy formed has a "Moly" (molybdenum) phase that shows a hardness of 900 KHN that compares with about 400 Vickers for pure molybdenum. The fact that both tungsten and molybdenum show high particle hardness numbers indicates interstitial hardening with oxygen in the case of the moly constituent and either oxygen and boron, or boron alone in the case of the tungsten phase.

Upon subjecting one of the resultant final coatings on a piston ring to an electron probe analysis, the following volume percentages were determined for the indicated phases of the coating composition and the corresponding weight percentages were calculated:

| Coating | Voume % | Weight % Approximate Calculated |
|---|---|---|
| W, Co phase | 13.3 (13 approx.) | 23.8 |
| Molybdenum phase | 42.1 (42 approx.) | 42.4 |
| Ni chrome alloy phase | 44.6 (45 approx.) | 33.8 |
| Total: | 100.0 | 100.0 |

The composition of the tungsten-cobalt (W, CO) phase upon analysis consisted of the following by volume percent:
W = 91.3 %
Co = 8.3 %
Si = 0.06 %

C = 0.0 %
Fe = 0.3 %

The nickel-chrome alloy phase consisted of the following by volume percent:

Ni = 65.4 %
Cr = 22.1 %
Si = 3.7 %
Fe = 1.7 %
B = 7.1 %

The moly phase consisted of 100% molybdenum.

In addition to the microprobe analysis, a spectrophotometric analysis of the final coating of this invention was made. The following are weight percentages (not volume percent) of the phases of the coating according to the spectrophotometric analysis made:

| | |
|---|---|
| W, Co | 26% by wt. |
| Molybdenum | 45% by wt. |
| Nickel-chromium Alloy | 29% by wt. |
| Total: | 100% by wt. |

By way of explanation, in calculating the "Nickel-Chromium Alloy" to be 29 percent by wt., the 29 percent included the total nickel-chromium-boron-silicon-aluminum-iron content. Since nickel is alloyed, it does not appear as free nickel. As shown in the following breakdown, however, the alloy of only nickel (15 percent) and chromium (4 percent) comprises 19 percent by wt. The spectrophotometric analysis does show iron, silicon and aluminum as constituents of the applied coating.

The breakdown of the analysis into individual elements is as follows:

| | |
|---|---|
| Mo—45% | Cr—4% |
| W—18% | Fe—4.5% |
| Ni—15% | Si—3% |
| Co—8% | Al—1% |

Boron—not determined but by difference=2%

It should be pointed out that differences in the analysis obtained for the starting powder and for the final coating produced from such starting powder are generally rather great. This may be due to losses of metal values in the case of the finer powder particles, either because of more rapid and more complete oxidation or actual volatilization or because of loss of some powdered material by impingement against and adherence to the mandrel on which the piston rings are mounted while being flame-sprayed. In the case of the analyses given above, the molybdenum powder was much coarser than the tungsten-carbide-cobalt powder. Specifically, the molybdenum had a particle size range of: plus 140 mesh amounting to 50 percent max. and of minus 325 mesh amounting to 20 percent max., when tested on U.S. Standard Screens.

As previously stated, the total composition of our preferred powder mixture fed into the plasma jet spray gun is substantially devoid of free nickel and free aluminum, as well as aluminum oxide. Nickel aluminide is preferably not included among the powder ingredients of our present hard, scuff-resistant bearing facing material, and molybdenum is substituted in place of free nickel or free aluminum oxide or nickel aluminide. The nickel that is intentionally added as an element of the nickel-chromium-boron silicon alloy becomes an integral ingredient of that alloy and also of the final alloy and is not in a free state. In nickel aluminide, the nickel is not in a permanently alloyed state with the aluminum, but is easily broken down into free nickel and free aluminum, both of which are detrimental to the forming of a highly scuff-resistant facing material for the seals of reciprocating and rotary piston-types of internal combustion engines.

FIGS. 6–11 illustrate various types of sealing elements for use in Wankel type engines and similar rotary piston engines that have sealing elements between the rotor and housing side faces as well as between the peripheral faces of the rotor and housing. The sealing elements, in accordance with our invention are provided with bearing facings such as herein described for insuring hard, wear-and scuff-resistant seals between any relatively sliding surfaces. The sealing elements provided with such bearing facings can be so shaped and assembled as to act as compression seals more efficiently and over longer periods of useful life than sealing means heretofore known in the art.

In FIGS. 6 and 7 the reference numeral 60 indicates an apex seal for use with a rotary piston type of internal combustion engine. The apex seal 60 has an elongated body portion 61 that is U-shaped in cross-section and that has a bight portion 62 which is grooved as at 63 to retain a bearing facing alloy 64. The grooved portion 63 is relatively shallow, with a plane bottom wall 65 and with slightly diverging lengthwise extending walls 66. Any of our alloys described for use as bearing facings or coatings can be satisfactorily used as the alloy 64.

FIG. 8 is a sectional view of a modified form of apex seal 93 similar to that of FIG. 7 but with the bearing facing alloy 64 providing a coating 95 that extends completely over the upper face at 94 (as viewed) and along the sides as at 96.

FIG. 9 illustrates a section of an inner oil seal ring 70 for use with a rotary piston type of internal combustion engine. Said ring 70 is of a shallow U-shape in cross-section, having short radially inner and outer leg portions 71 and a bight portion 72 joining said leg portions. The inner and outer annular surfaces 73 and 74, respectively, of said legs 71 are generally planar and parallel. A shallow groove 75 extends along the annular inner surface 73 and is filled with a suitable alloy 76 to provide a bearing facing 77 along an inner annular face of the oil ring of which the portion 70 that is shown is only a section. The entire oil seal ring indicated by the reference numeral 78 is a closed annulus, i.e. it has no gap. The groove 75 is of varying depth along its height, being shallower toward the upper extent of the leg surface 73 and deeper toward the lower extent of said surface 73, when viewed as shown in FIG. 9. This variation in the depth of the groove provides a greater depth or thickness of the alloy 76 where the bearing load is greatest.

FIGS. 10 and 11 illustrate a slipper type of apex seal for a rotary piston type of internal combustion engine. This particular seal is generally used in combination with an apex spacer, a side seal and a side seal expander.

The seal shown in FIGS. 10 and 11 is indicated generally by the reference numeral 80. The reference numeral 81 designates a portion of the inner surface of the wall 82 forming a part of the trochoid shaped rotary piston housing with which the seal 80 is maintained in a sliding sealing relationship. The slipper-type seal 80 is T-shaped in cross-section, as viewed in FIG. 11, with a stem portion 83 extending along one side 84 of the head portion 85 of the seal and with a pair of ribs 86 and 87 extending in spaced parallel relation from and along the other side 88 of said head portion 85.

Said ribs 86 and 87 are provided with grooves 89 and 90, respectively, that are filled with any of the alloys described herein as being suitable for bearing facings. The bearing facings 91 and 92 provided by the alloy fillings in the grooves 89 and 90, respectively, are in sliding, sealing relationship with respect to the inner surface 81 of the wall 82 during operation of the engine. The stem portion 83 is received in and carried by an apex seal carrier (not shown) that permits sufficient pivotal movement of said stem portion that the bearing facings 91 and 92 throughout operation of the engine can maintain sealing, sliding contact between said facings and the inner surface 81 that forms a portion of the trochoid shaped rotary piston housing.

The bearing facings or coatings embodying our invention are composed of a number of distinct phases and/or alloys well dispersed in a molybdenum matrix. The final coating includes a hard tungsten-cobalt-phase and a nickel-chromium alloy in a molybdenum matrix.

We claim as our invention:

1. A sealing element having a relatively rigid body and an alloy coating thereon composed of a tungsten-cobalt phase, a molybdenum phase and a nickel-chromium alloy phase,
said tungsten-cobalt phase being substantially free from carbon and constituting about 13 percent of said alloy coating by volume as determined by electron probe analysis.

2. A sealing element as defined by claim 1 wherein said molybdenum phase is substantially 100 percent molybdenum and constitutes about 42 percent by volume of said alloy coating by electron probe analysis.

3. A sealing element as defined by claim 1 wherein said nickel-chromium alloy phase constitutes about 45 percent by volume of said alloy coating by electron probe analysis.

4. A sealing element as defined by claim 1 wherein said tungsten-cobalt phase by spectrophotometric analysis constitutes about 26 percent by weight of said alloy coating.

5. A sealing element as defined by claim 1 wherein said molybdenum phase by spectrophotometric analysis constitutes about 45 percent by weight of said alloy coating.

6. A sealing element as defined by claim 1 wherein said nickel-chromium alloy phase constitutes about 29 percent by weight of said alloy coating.

7. A sealing element as defined by claim 1 wherein said tungsten-cobalt phase constitutes by electron probe analysis about 13 percent by volume and by spectrophotometric analysis about 26 percent by weight of said alloy coating;
said molybdenum phase constitutes by electron probe analysis about 42 percent by volume and by spectrophotometric analysis about 45 percent by weight of said alloy coating; and
said nickel-chromium alloy phase constitutes by electron probe analysis about 45 percent by volume and by spectrophotometric analysis about 29 percent by weight of said alloy coating.

8. A sealing element having a relatively rigid ferrous substrate and an alloy coating forming a bearing facing bonded thereto,
said alloy coating having the following phases constituting the respective approximate volume and weight percentages as shown:

| Alloy Coating (Phases) | Volume % (electron probe analysis) | Weight % (spectrophotometric analysis) |
|---|---|---|
| W, Co | 13.3 | 26 |
| Mo | 42.1 | 45 |
| Ni—Cr | 44.6 | 29 | said alloy coating having the following approximate percentages by weight of individual elements:
Mo—45%
W—18%
Ni—15%
Co—8%
Cr—4%
Fe—4.5%
Si—3%
Al—1%
B—Not determined but calculated by difference =2%

9. A sealing element for use in restricting the flow of fluids between superfically contacting relatively sliding surfaces,
said sealing element having a relatively rigid body and a coating on a bearing face of said body for bearing contact with one of said surfaces to effect a seal between said surfaces, said sealing element coating being that resulting from an oxidizing plasma flame applied powder mixture of starting ingredients consisting essentially of:
from about 38 percent to about 42 percent by weight of a tungsten carbide-cobalt aggregate, from about 30 percent to about 40 percent by weight of molybdenum and from about 18 to about 32 percent by weight of a nickel-chromium-boron-silicon alloy.

10. A sealing element as defined in claim 9 in which the tungsten carbide-cobalt aggregate has the following analysis expressed in percentages by weight:

| | |
|---|---|
| tungsten | 79.5 to 83.5% |
| cobalt | 11 to 13% |
| carbon | 5.15 to 9.5% |
| iron | 1.5% maximum | and the balance by difference being non-essential components including impurities.

11. A sealing element as defined by claim 9 in which the nickel-chromium-boron-silicon alloy has the following analysis expressed in percentages by weight:

| | |
|---|---|
| nickel | 60 to 75% |
| chromium | 13 to 20% |
| silicon | 3 to 5% |
| boron | 2.75 to 4.7% |
| iron | 3 to 5% |
| carbon | 0.6 to 1.3% |
| cobalt | 0.1 % maximum | and the balance by difference being non-essential components including impurities.

12. A sealing element as defined by claim 10 wherein said nickel-chromium-boron-silicon alloy is within the weight percentage ranges defined by claim 11.

13. A sealing element as defined by claim 9 wherein the elements of said powder mixture are present within the following range percentages by weight:

| | |
|---|---|
| tungsten | from about 30 to about 35% |
| cobalt | from about 4 to about 6% |
| carbon | from about 1.9 to about 4% |
| molybdenum | from about 30 to about 40% |
| nickel | from about 10 to about 24% |
| chromium | from about 2.3 to about 6.4% |
| silicon | from about 0.5 to about 1.6% |
| boron | from about 0.4 to about 1.5% |
| iron | from about 0.5 to about 0.6% | and the balance by difference being non-essential ingredients including impurities.

14. A sealing element as defined by claim 9 wherein said sealing element is a piston ring and said bearing face coating is a hard wear-resistant and scuff-resistant coating.

15. A sealing element as defined by claim 9 wherein said sealing element is a rotary combustion engine piston seal and said bearing face coating is a hard wear-resistant and scuff-resistant coating.

16. A sealing element having a relatively rigid body and an alloy coating formed in situ thereon composed of a tungsten-cobalt phase, a molybdenum phase and a nickel-chromium-boron-silicon alloy phase, said tungsten-cobalt phase being substantially free from carbon and constituting about 13 percent of said alloy coating by volume.

17. A sealing element as defined by claim 16 in which the starting ingredients are substantially the same as specified in claim 9.

18. A sealing element as defined by claim 6 wherein said molybdenum phase is substantially 100 percent molybdenum and constitutes about 42 percent by volume of said alloy coating.

19. A sealing element as defined by claim 18 wherein the starting ingredients are substantially the same as specified in claim 9.

20. A sealing element as defined by claim 16 wherein said nickel-chromium-boron-silicon alloy phase constitutes about 45 percent by volume of said alloy coating.

21. A sealing element as defined by claim 16 wherein said tungsten-cobalt phase by microprobe analysis constitutes about 26 percent by weight of said alloy coating.

22. A sealing element as defined by claim 16 wherein said molybdenum phase by microprobe analysis constitutes about 45 percent by weight of said alloy coating.

23. A sealing element as defined by claim 16 wherein said nickel-chromium-boron-silicon alloy phase by microprobe analysis constitutes about 29 percent by weight of said alloy coating.

* * * * *